Dec. 2, 1924.
A. V. KOUBA
HONEYCOMB RACK
Filed Nov. 14, 1923
1,518,077
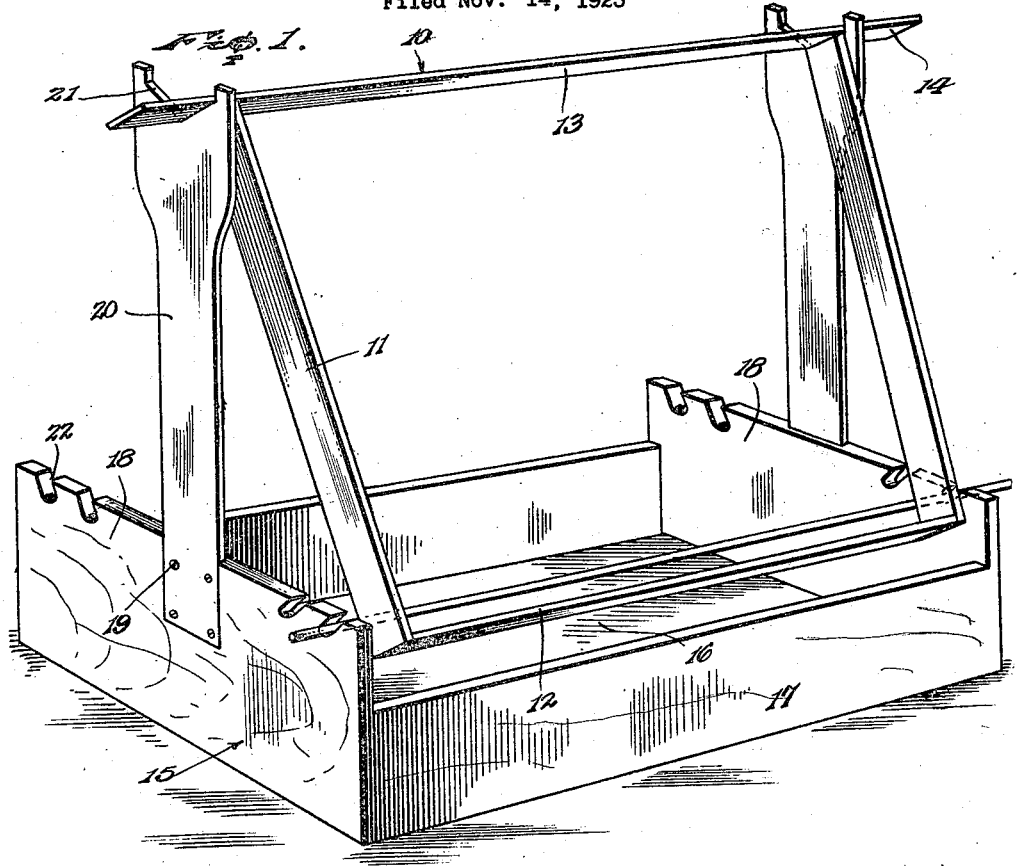
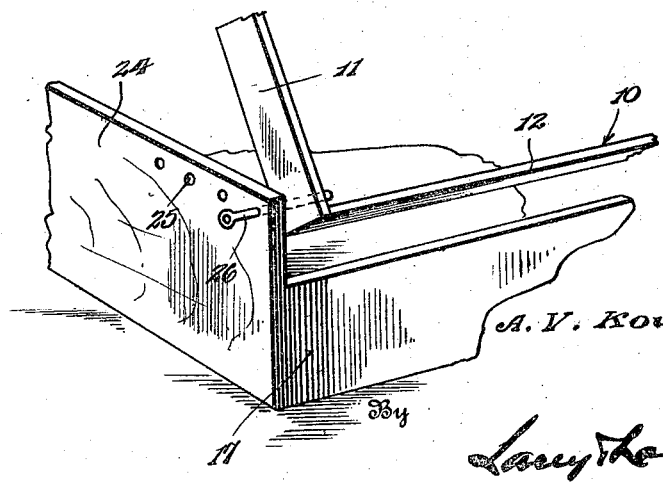

Patented Dec. 2, 1924.

1,518,077

UNITED STATES PATENT OFFICE.

ANTON V. KOUBA, OF VERDIGRE, NEBRASKA.

HONEYCOMB RACK.

Application filed November 14, 1923. Serial No. 674,673.

*To all whom it may concern:*

Be it known that ANTON V. KOUBA, a citizen of the United States, residing at Verdigre, in the county of Knox and State of Nebraska, have invented certain new and useful Improvements in Honeycomb Racks, of which the following is a specification.

My invention relates to a rack intended to support honey comb frames to facilitate the handling thereof and their inspection without disturbing the bees on the comb. The frames may thus be removed from the hive and suspended in the rack with the bees adhering thereto principally for the purpose of catching the queen bees, to clip their wings, remove the queen cells and such other work needed for proper bee cultivation. When using these racks the operator has both hands free to do the work.

The device is illustrated in the accompanying drawing, and—

Figure 1 is a perspective view of the rack with the honey comb frame deposited therein, and—

Figure 2 is a fragmentary perspective view of the rack and frame showing a slight modification.

In the drawing, reference numeral 10 represents a honey comb frame of the ordinary type having two sides 11, a bottom slat 12 and a top bar 13 with its ends 14 extending beyond the sides 11 of the frame. As is well known a honey comb is built within the four sides of a frame and is generally quite heavy when filled with honey, for this reason being rather awkward to handle and the work being rather fatiguing if a number of frames have to be inspected.

The rack consists of an open box 15 having a bottom 16, front and rear walls 17 and end walls 18 which are higher than the front and rear walls. Medially of the end walls 18 are secured by screws or the like as indicated at 19, standards 20 forming a rigid connection with each of the side walls. The standards are recessed at their upper ends, as at 21, in order to receive the projecting ends 14 of the frames. The recesses are, as indicated, preferably V-shape to best accommodate the frames. The length of the box and the distance between the standards 20 are slightly greater than the width of the honey comb frame 10 so that the latter can easily be disposed between the standards. The height of the front and rear walls 17 will also permit the swinging crossways of the frame when hung between the standards without interference.

The top edge of each of the side walls 18 is provided with a series of notches 22. These notches are inclined inwardly and downwardly from each outer corner of the side walls as indicated in Figure 1. The notches are arranged in pairs or, in other words, a notch in the left hand end wall corresponds to a notch formed in the right hand end wall so that a supporting rod 23 may be deposited in two of said oppositely situated notches across the length of the box 15. The rod 23 is slightly longer than the length of the box so that its ends extend beyond the end walls thereof.

When a honey comb frame 10 is going to be inspected it is taken out of the bee hive and hung in the recesses 21 of the standards 20 and the rod 23 deposited in a pair of the notches 22 most suitable for the intended inspection. The bottom 12 of the honey comb is swung outwardly before placing the rod in this position and thereupon permitted to rest against the rod. In this manner the surface of the frame is given a suitable inclination so that the needed inspection and operation may be comfortably conducted, the operator having both hands free for such work. It should be observed that not only the two sides 11 in this manner are supported on the rod 23 but also the entire bottom portion of the honey comb. This is very important for heavily filled honey combs as they otherwise might get loose from the frame and fall down or be accidentally detached therefrom. When the inspection of one side of the honey comb has been completed the same is swung over to the opposite side of the box and the supporting rod 23 shifted to the notches at the opposite end of the side walls 18.

In Figure 2 a slight modification has been shown which may be used for smaller or narrower frames when it is not necessary to support the entire length of the honey comb but only the two ends of the frame. The end walls 24 in this modified form of the invention are shown with a series of apertures 25 along the upper edge near the outer corners thereof. These apertures are intended to receive pins 26 which are inserted from the outside of the end walls and project a sufficient distance inwardly thereof to obstruct the swinging inwardly of the frame 10 when deposited in the standards of the rack.

The pins 26, as well as the supporting rod 23, are preferably made of stout steel wires, the rod 23 particularly must be fairly stiff in order to sustain the honey combs which become very heavy when filled with honey and brood, especially in very hot weather when the wax becomes soft. The rod then has to sustain the weight of the lower end of the honey comb and to prevent it from sagging at the bottom where it usually is not fastened.

Having thus described the invention, what is claimed as new is:

1. A rack for honey comb frames comprising a box-like structure, standards mounted on the ends of the structure adapted to receive at their upper ends the projecting portions of the honey comb frame, and means for sustaining the frame in tilted position in the rack.

2. A rack for honey comb frames comprising a box-like structure, standards mounted on the ends of the structure adapted to receive at their upper ends the projecting portions of the honey comb frame, means for sustaining the frame in tilted position in the rack, the said means including a transversely directed member, and a series of seats provided in said box-like structure for selectively engaging said transverse member.

3. A rack for honey comb frames comprising an open box, said box including side and end walls, the end walls being higher than the side walls and provided with a series of notches along their upper edges, a cross rod adapted to rest in said notches, and standards rigidly secured on said end walls and medially thereof, each of said standards having a V-shaped recess at its upper end adapted to engage with projecting portions on the honey comb frame, said cross rod adapted to simultaneously support the lower end of the frame, thereby holding it in slanting position.

4. A rack for honey comb frames comprising standards adapted to support the top end of a honey comb frame, and means for sustaining the frame in tilted position.

5. A rack for honey comb flames comprising supporting elements for the top end of a honey comb frame, and means for sustaining the frame in adjustable tilted position.

In testimony whereof I affix my signature.

ANTON V. KOUBA. [L. S.]